US012637897B2

(12) United States Patent
Duchesneau et al.

(10) Patent No.: US 12,637,897 B2
(45) Date of Patent: May 26, 2026

(54) HYBRID WINDOW FRAME ASSEMBLY WITH IMPROVED CORNER SEALS

(71) Applicant: Fenplast Inc., Candiac (CA)

(72) Inventors: Karl Duchesneau, Candiac (CA); Geoffroy Bussière, Candiac (CA); Louis Major, Candiac (CA); Claude Garceau, Candiac (CA)

(73) Assignee: FENPLAST INC., Candiac (CA)

(*) Notice: Subject to any disclaimer, the term of this patent is extended or adjusted under 35 U.S.C. 154(b) by 215 days.

(21) Appl. No.: 18/532,367

(22) Filed: Dec. 7, 2023

(65) Prior Publication Data

US 2024/0191557 A1 Jun. 13, 2024

Related U.S. Application Data

(60) Provisional application No. 63/431,342, filed on Dec. 9, 2022.

(51) Int. Cl.
*E06B 3/96* (2006.01)
*E06B 3/26* (2006.01)

(52) U.S. Cl.
CPC .......... *E06B 3/2605* (2013.01); *E06B 3/9612* (2013.01); *E06B 3/9616* (2013.01); *E06B 2003/2625* (2013.01)

(58) Field of Classification Search
CPC ........ E06B 3/96; E06B 3/9604; E06B 3/9608; E06B 3/9612; E06B 3/9616; E06B 3/962; E06B 3/9682; E06B 3/9681; E06B 2003/2625
USPC .............................................. 52/656.5, 656.9
See application file for complete search history.

(56) References Cited

U.S. PATENT DOCUMENTS 1,652,607 A * 12/1927 Campbell ............. E06B 3/9608 52/775
3,137,744 A * 6/1964 Burrus .................. F25D 23/064 264/45.3
3,703,063 A * 11/1972 Budich ..................... E06B 3/60 49/504

(Continued)

FOREIGN PATENT DOCUMENTS

DE 4303877 A1 * 8/1994 .............. B60L 13/03
DE 10118791 A1 * 2/2003 ........... E06B 3/9682

(Continued)

*Primary Examiner* — Ryan D Kwiecinski
(74) *Attorney, Agent, or Firm* — DIPCHAND LLP

(57) ABSTRACT

A hybrid window frame assembly includes a primary window frame formed of a first material connected to a cladding frame formed of a second material. The cladding frame includes a peripheral channel defining a recess that receives a peripheral bead of the window frame to connect the cladding frame to the window frame. The hybrid window frame further includes injection block cutouts at each corner. Each injection block cutout exposes at least a portion of respective inner sidewalls of the channel and bead. The hybrid window frame assembly further includes injection blocks inserted in each injection block cutout. Each injection block includes at least one injection hole accessible from an exterior of the hybrid window frame assembly. The hybrid window frame assembly further includes sealant injected through the at least one injection hole of each injection block to seal respective corners of the window frame and cladding frame together.

26 Claims, 15 Drawing Sheets

(56) References Cited

U.S. PATENT DOCUMENTS

| | | | | | |
|---|---|---|---|---|---|
| 5,634,306 | A * | 6/1997 | Riegelman | E06B 3/205 | 52/656.1 |
| 6,047,514 | A * | 4/2000 | Verch | E06B 3/221 | 52/656.1 |
| 6,746,175 | B1 * | 6/2004 | Gonnerman | E06B 3/962 | 403/403 |
| 7,380,384 | B2 * | 6/2008 | Bourly | E06B 3/9608 | 52/204.593 |
| 7,634,880 | B2 * | 12/2009 | Sironko | E06B 3/9612 | 52/456 |
| 11,585,149 | B2 * | 2/2023 | Belau | E06B 3/9681 | |
| 11,634,941 | B2 * | 4/2023 | Tenzon | E06B 7/2312 | 49/504 |
| 11,834,893 | B1 * | 12/2023 | Pigott, Jr. | E06B 3/4415 | |
| 12,338,678 | B2 * | 6/2025 | Ohrstrom | E06B 3/06 | |
| 2005/0028460 | A1 * | 2/2005 | Steffek | E06B 3/24 | 52/204.5 |
| 2009/0293409 | A1 * | 12/2009 | Capece | E06B 3/305 | 52/656.2 |
| 2011/0194886 | A1 * | 8/2011 | Wu | E06B 3/9641 | 403/23 |
| 2011/0308169 | A1 * | 12/2011 | Lambertini | E06B 3/9641 | 49/417 |
| 2019/0381748 | A1 * | 12/2019 | Matsuda | E06B 3/9604 | |
| 2020/0263489 | A1 * | 8/2020 | Feil | E06B 3/968 | |
| 2021/0010320 | A1 * | 1/2021 | Belau | E06B 3/9612 | |
| 2022/0372814 | A1 * | 11/2022 | DeMello | B32B 3/266 | |
| 2023/0070815 | A1 * | 3/2023 | Zhang | E06B 3/9645 | |
| 2024/0191557 | A1 * | 6/2024 | Duchesneau | E06B 3/2605 | |

FOREIGN PATENT DOCUMENTS

| | | | | | |
|---|---|---|---|---|---|
| DE | 102011118211 | A1 * | 5/2013 | E06B 3/9682 |
| DE | 102013100240 | A1 * | 7/2014 | E06B 3/962 |
| DE | 102015015895 | A1 * | 6/2017 | E06B 3/9682 |
| DE | 102022103403 | A1 * | 8/2023 | E06B 3/9624 |
| EP | 1911925 | A2 * | 4/2008 | E06B 3/9682 |
| EP | 2907959 | A1 * | 8/2015 | E06B 3/9682 |
| EP | 4332338 | A1 * | 3/2024 | E06B 3/9682 |
| FR | 2759111 | A1 * | 8/1998 | B29C 65/42 |
| FR | 2759111 | B1 | 10/1999 | |
| KR | 20070082269 | A * | 8/2007 | E06B 3/9604 |
| WO | WO-8700884 | A1 * | 2/1987 | E06B 3/9681 |
| WO | WO-9955996 | A1 * | 11/1999 | E06B 3/9608 |
| WO | WO-2004003326 | A1 * | 1/2004 | E06B 3/9642 |
| WO | 2005021916 | A1 | 3/2005 | |

* cited by examiner

HYBRID WINDOW FRAME ASSEMBLY WITH IMPROVED CORNER SEALS

PRIORITY

This disclosure claims priority to U.S. Provisional Pat. App. No. 63/431,342 filed Dec. 9, 2022, which is hereby incorporated by reference herein in its entirety.

FIELD OF THE INVENTION

The teaching disclosed herein relate to window frames, and in particular to a hybrid window frame assembly with improved corner seals between a primary window frame formed of a first material and a cladding frame formed of a second material.

BACKGROUND OF THE INVENTION

US20090293409A1 (Capece) relates to an innovative sectional element for door and window frames for the residential and industrial building sector. The sectional element is substantially made up of two structural elements rigidly fixed to one another: a first structural element preferably made of aluminum and having a preferably open cross section, and a second structural element made of laminated plastic having preferably also a decorative function.

U.S. Pat. No. 3,703,063A (Budich et al.) discloses a profile member for windows, doors or the like. The profile member is formed by a hollow closed metal section having a shell of synthetic material providing one or more projections including a glaze projection for accommodating a glass pane, a connecting projection which facilitates connection of the member to a structural building part, and an abutment projection for effecting contact producing closure with another profile member.

FR2759111 B1 (Fromentin et al.) discloses an assembly element for hollow extrusions of the same cross-section, joined by mitred corners. The assembly element consists of an L-shaped right-angled component with branches of the same size as the apertures in the extrusions and fixed in place with an adhesive injected through a hole corner of the assembled extrusions connecting with a second hole in the assembly element. The adhesive, which is quick-setting and compatible with the material of the extrusions and the assembly component, especially an epoxy or hot-melt adhesive, emerges through apertures in the assembly component and adheres to the inner walls of the extrusion.

WO2005021916A1 (Lee et al.) discloses a composite material structure comprising a metal core having an uneven and grooved outer face, and a synthetic resin. The composite material structure is produced by co-extruding the metal core and the synthetic resin in in-line mode, thereby satisfying the required structural strength, eliminating the need of an adhesive, improving the workability, lessening post-processing steps, and expressing various desired colors. Conventional composite material structures can enhance the adhesion and prevent peeling between different materials by applying an adhesive upon co-extrusion of the materials. In contrast, the disclosed composite material structure can prevent peeling between different materials by structurally designing the outer face of the metal core so as to have serrations and co-extruding the materials without the use of an adhesive. The synthetic resin allows the disclosed composite material structure to exhibit superior durability and weather resistance, and to express various desired colors.

The inner metal core, such as aluminum, co-extruded in in-line mode, together with the synthetic resin, allows the disclosed composite material structure to satisfy the required structural strength.

SUMMARY

The following summary is intended to introduce the reader to various aspects of the applicant's teaching, but not to define any invention.

In one aspect, a hybrid window frame assembly is disclosed. The hybrid window frame assembly includes a primary window frame formed of a first material and including a pair of horizontally spaced apart vertical window frame members connected by an upper horizontal window frame member and a lower horizontal window frame member arranged to define a central window opening. The window frame includes a peripheral bead having a bead outer sidewall extending about and projecting from a perimeter of the window frame, a bead inner sidewall inboard of the outer sidewall, and a bead front wall extending between respective distal ends of the bead outer and inner sidewalls. The window frame has four window frame corners. Each window frame corner is formed at a junction between an end of one of the vertical window frame members and a corresponding end of one of the horizontal window frame members. The hybrid window frame assembly further includes a cladding frame formed of metal and including a pair of horizontally spaced apart vertical cladding frame members connected by an upper horizontal cladding frame member and a lower horizontal cladding frame member. The cladding frame includes a peripheral channel having a channel outer sidewall, a channel inner sidewall inboard of the channel outer sidewall, and a channel front wall extending between respective distal ends of the channel outer and inner sidewalls. The channel outer sidewall, the channel inner sidewall and the channel front wall define a recess in which the peripheral bead is received to connect the cladding frame to the window frame. The cladding frame has four cladding frame corners. Each cladding frame corner is aligned with a corresponding one of the window frame corners and formed at a junction between an end of one of the vertical cladding frame members and a corresponding end of one of the horizontal cladding frame members. The hybrid window frame further includes four injection block cutouts. Each injection block cutout extends through at least a portion of the channel outer sidewall, the bead outer sidewall and the bead inner sidewall to provide a cut bead inner sidewall portion and to expose a portion of the channel inner sidewall at a respective one of the cladding frame corners. The hybrid window frame assembly further includes four injection blocks. Each injection block is sized to fit in a respective one of the injection block cutouts. Each injection block includes at least one injection hole accessible from an exterior of the hybrid window frame assembly. The hybrid window frame assembly further includes sealant injected through the at least one injection hole of each injection block to seal the window frame to the cladding frame along an interior junction of the window frame and the cladding frame, the interior junction comprising a width of the channel inner sidewall of the cladding frame, wherein the sealant seals the width of the channel inner sidewall to the cut bead inner sidewall portion.

In some examples, the first material is polyvinyl chloride.

In some examples, the second material is metal.

In some examples, the second material is aluminum.

In some examples, the sealant comprises silicone.

In some examples, the at least one injection hole of each injection block includes spaced apart first and second injection holes.

In some examples, the central window opening is configured to engage one or more window panes.

In some examples, each of the vertical and horizontal window frame members defining the window opening have an inner surface configured to engage a respective side of a window sash.

In another aspect, a hybrid window frame assembly is disclosed. The hybrid window frame assembly includes a window frame formed of a first material and including at least three window frame members arranged to define a central window opening. The window frame has a peripheral bead extending about and projecting from a perimeter of the window frame. The window frame has at least three window frame corners. Each window frame corner is formed at a junction between two abutting window frame members of the at least three window frame members. The hybrid window frame assembly further includes a cladding frame formed of a second material and including at least three cladding frame members. Each cladding frame member is associated with a respective one of the window frame members. The cladding frame has a peripheral channel extending about a perimeter of the cladding frame. The channel defines a recess in which the peripheral bead is received to connect the cladding frame to the window frame. The cladding frame has at least three cladding frame corners. Each cladding frame corner is aligned with a respective one of the window frame corners and formed at a junction between two abutting cladding frame members of the at least three cladding frame members. The hybrid window frame assembly further includes at least three injection block cutouts. Each injection block cutout extends through at least a portion of the peripheral bead and the peripheral channel to provide a cut bead inner sidewall portion and to expose a portion of the inner sidewall of the channel at a respective one of the cladding frame corners. The hybrid window frame assembly further includes at least three injection blocks. Each injection block is sized to fit in a respective one of the injection block cutouts. Each injection block includes at least one injection hole accessible from an exterior of the window frame assembly. The hybrid window frame assembly further includes sealant injected through the at least one injection hole of each injection block to seal the bead inner sidewall of the window frame to the cladding frame along an interior junction of the window frame and the cladding frame, the interior junction comprising a width of the channel inner sidewall of the cladding frame, wherein the sealant seals the width of the channel inner sidewall to the cut bead inner sidewall portion.

In some examples, the first material is polyvinyl chloride (PVC).

In some examples, the second material is metal. In other examples, the second material is aluminum.

In some examples, the peripheral bead has a bead outer sidewall extending about and projecting from the perimeter of the window frame, a bead inner sidewall inboard of the bead outer sidewall, and a bead front wall extending between respective distal ends of the bead outer and inner sidewalls.

In some examples, the peripheral channel has a channel outer sidewall, a channel inner sidewall inboard of the channel outer sidewall, and a channel front wall extending between respective distal ends of the channel outer and inner sidewalls, and the recess in which the peripheral bead is received is defined by the channel outer sidewall, the channel inner sidewall and the channel front wall.

In some examples, the sealant comprises silicone.

In some examples, the at least one injection hole of each injection block includes spaced apart first and second injection holes.

In some examples, the central window opening is configured to engage one or more window panes.

In some examples, each of the vertical and horizontal window frame members defining the window opening have an inner surface configured to engage a respective side of a window sash.

In another aspect, a method of manufacturing a hybrid window frame assembly is disclosed. The method comprises positioning a cladding frame made from a first material on a window frame made from a second material to produce a hybrid window frame; providing an opening at each outer corner of the hybrid window frame that exposes an inner sidewall of the cladding frame, inserting an injection block into each of the openings, each injection block having at least one injection hole, and injecting sealant through the at least one injection hole of each injection block to create watertight seals between the cladding frame and the window frame at an interior junction of the window and cladding frames at each corner of the hybrid window frame.

In some examples, the method further includes, after said injecting, cutting and then welding the hybrid window frame assembly.

In some examples, the method further includes, before said positioning, cutting and then welding the cladding frame; and, before said positioning, cutting and then welding the window frame.

In some examples, said providing the opening at each corner of the hybrid window frame comprises using a cutting machine to cut the openings.

In another aspect, a hybrid window frame injection block is disclosed, which is sized to fit in a respective injection block cutout extending through an outer corner portion of a window frame assembly and comprises an inner face configured to make contact with the window frame assembly when the injection block is inserted in the injection block cutout, an outer face comprising at least one injection hole configured to receive injection of a sealant from an exterior corner of the window frame assembly when the injection block is inserted in the injection block cutout, and at least one sealant channel defined along the inner face, wherein the sealant channel is confluent with the at least one injection hole and is configured to distribute the sealant injected into the injection hole along an interior junction of a window frame and a cladding frame comprised in the window frame assembly.

In some examples, the at least one injection hole comprises two or more spaced apart injection holes.

In some examples, the at least one sealant channel comprises two or more confluent sealant channels.

In some examples, the at least one sealant channel comprises two or more interconnected cavities.

In some examples, one or more vents disposed in a distal end of the injection block.

Other aspects and features of the teachings disclosed herein will become apparent to those ordinarily skilled in the art, upon review of the following description of the specific examples of the present disclosure.

BRIEF DESCRIPTION OF THE DRAWINGS

For a better understanding of the described examples and to show more clearly how they may be carried into effect, reference will now be made, by way of example, to the accompanying drawings in which:

FIG. 7B shows sealant dispensers positioned within the injection holes of the injection block;

Figure 1:
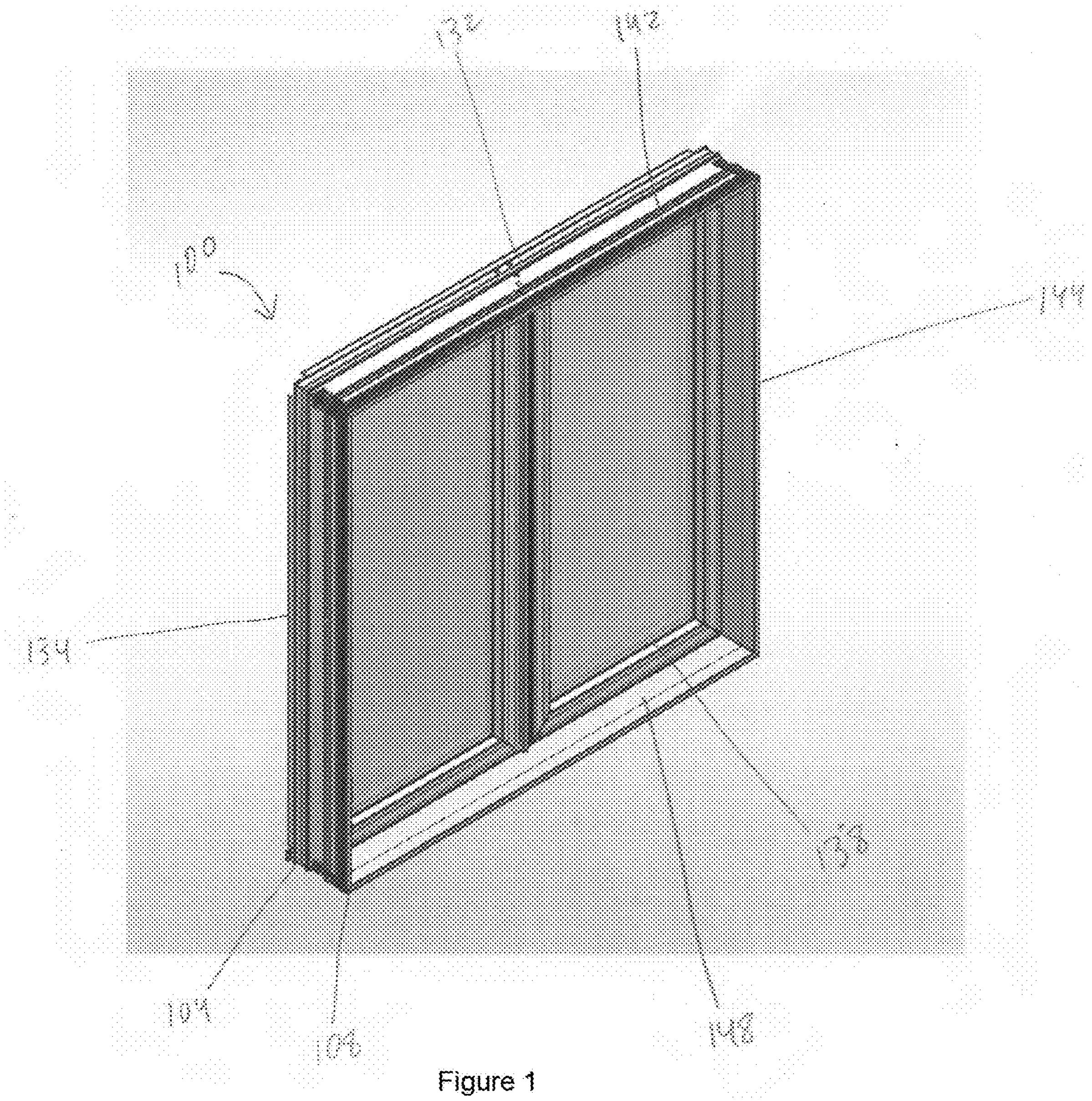
FIG. 1 is a front perspective view of a hybrid window frame assembly according to aspects of the teaching disclosed herein.

The drawings included herewith are for illustrating various examples of apparatuses and methods of the teaching of the present specification and are not intended to limit the scope of what is taught in any way.

DETAILED DESCRIPTION

Various apparatuses or processes will be described below to provide an example of each claimed invention. No example described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an example of any claimed invention. Any invention disclosed in an apparatus or process described below that is not claimed in this document may be the subject matter of another protective instrument, for example, a continuing patent application, and the applicants, inventors, or owners do not intend to abandon, disclaim, or dedicate to the public any such invention by its disclosure in this document.

A challenge of hybrid window frame assemblies (e.g., a PVC window frame covered with aluminum cladding) lies in the ability to seal the cladding frame to the window frame to prevent water infiltration. The primary window frame and cladding frame are made of different materials so providing a watertight seal between the two can be challenging. Conventional approaches to manufacturing such hybrid window frame assemblies consist mainly in assembling cladding components (cut, machined and/or punched) to be assembled on a pre-welded primary window frame. There are also mechanical frame assemblies where the corners are screwed together. In either case, to prevent water infiltration, the cladding frame must be sealed to the primary window frame linearly and at the corners.

Among the methods currently used to seal the frame, the most common is to use a sealant. The sealant is typically applied to the perimeter of the cladding frame thus linearly sealing the cladding frame and the primary window frame. Applying the sealant to the corners of the primary window frame before inserting the cladding frame thus seals the junction at the corners of the cladding frame and the primary window frame.

The known assembly operations of hybrid window frame assemblies are labour intensive, requiring many steps and manual intervention. The primary window frames are cut and welded separately from the cladding frame which are also cut and prepared (e.g., punched and cut). The primary window frame and cladding frame are then assembled, followed by manual sealing steps.

The hybrid window frame assembly disclosed herein provides for a simplified manufacturing process that can be automated. Cutting the cladding frame when assembled on the primary window frame eliminates the need to cut the primary window frame and cladding frame separately and having to assemble them afterwards. This would considerably reduce the manufacturing burden. Welders can weld a window frame with a cladding frame simultaneously, regardless of whether they are cut together or assembled prior to welding.

A problem that remains is that the simultaneous welding of the window frame and the cladding frame does not ensure any sealing of the cladding frame to the window frame at the corners. Water can still easily infiltrate the junction and pass under the cladding frame and seep through. To address this problem, some manufacturers seal the corners by putting an exposed surface seal in the corners. However, this is a visible seal at the corners and is detrimental to the aesthetic of the hybrid window frame assembly.

Hybrid Window Frame Assemblies

Figure 2:
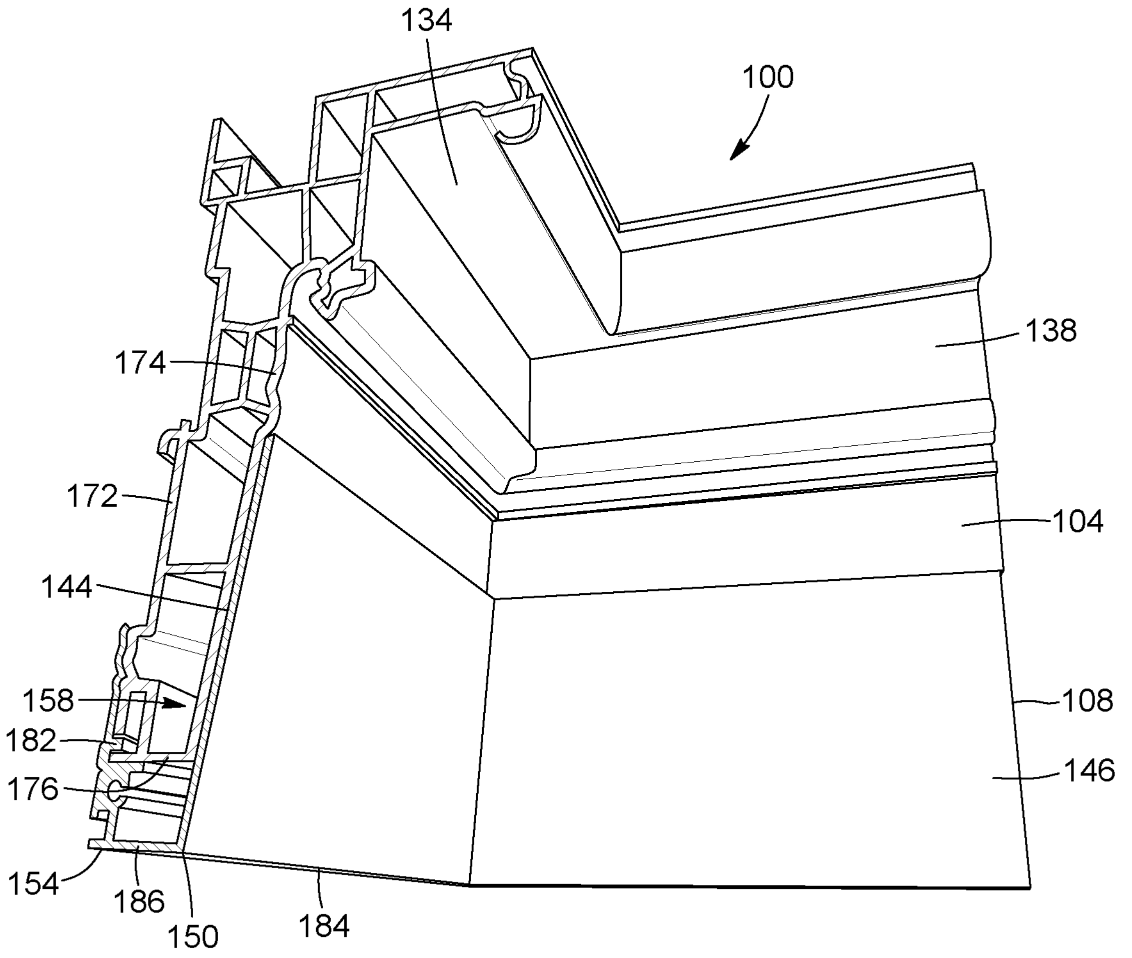
FIG. 2 is a front perspective view of a portion of a hybrid window frame assembly according to aspects of the teaching disclosed herein.
Figure 3:
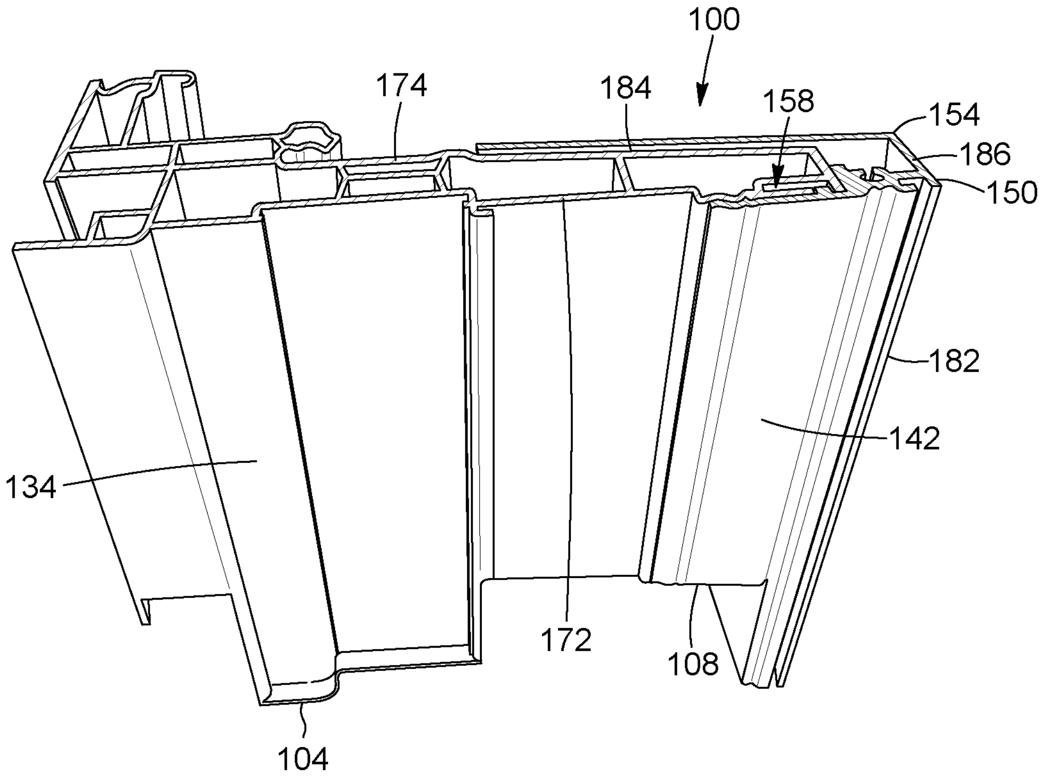
FIG. 3 is a side perspective view of the portion of the hybrid window frame assembly of FIG. 1.

Referring to FIGS. 1-3, a hybrid window frame assembly 100 or portion thereof in accordance with aspects of the teaching disclosed herein includes a primary window frame 104 connected to a cladding frame 108. The primary window frame 104 is formed of first material (e.g., polyvinyl chloride (PVC), wood, carbon fiber, aluminum, fiberglass, etc.). The cladding frame 108 is formed of a second material that is different from that of the first material. For example, the cladding frame 108 may be formed of metal (e.g., aluminum, titanium, stainless steel, etc.), vinyl, or fiberglass.

The window frame 104 includes at least three window frame members that are arranged to define a central window opening. For example, a rectangular window frame has a pair of horizontally spaced apart vertical window frame members 13 connected by an upper horizontal window frame member 132 and a lower horizontal window frame member 138. FIG. 1 illustrates only a portion of the lower horizontal window frame member 138, and FIGS. 2-3 illustrate only a portion of one of the vertical window frame members 134 and a portion of the lower horizontal window frame member 138. The upper horizontal window frame member 132 and the lower horizontal window member 138 may alternatively be referred to as a horizontal head member and a horizontal sill member, respectively. The vertical window frame members 134 may alternatively be referred to as vertical jamb members. Each of the vertical and horizontal window frame members 134, 132, 138 have an inner surface configured to engage a respective side of a window sash or windowpane.

The cladding frame 108 includes at least three cladding frame members. Each cladding frame member is associated with (e.g., covers) a respective one of the window frame members (i.e., a rectangular cladding frame 108 is used to cover a rectangular window frame 104, a triangular cladding frame 108 is used to cover a triangular window frame 104, and so on). For example, a rectangular cladding frame 108 includes a pair of horizontally spaced apart vertical cladding frame members 144 connected by an upper horizontal cladding frame member 142 and a lower horizontal cladding frame member 146. FIGS. 2-3 illustrate only a portion of one of the vertical cladding frame members 142 and a portion of the lower horizontal cladding frame member 146.

As best shown in FIGS. 2 and 3, the cladding frame 108 includes a peripheral channel 150 defining a recess 154 that receives a peripheral bead 158 of the window frame 104 to connect the cladding frame 108 to the window frame 104. The peripheral channel 150 extends along the perimeter of the cladding frame 108 (e.g., the full length of the vertical cladding frame members and the upper and lower horizontal cladding frame members). As a result, in the illustrated example, the recess 154 defined by the peripheral channel 150 is rectangular. The peripheral bead 158 extends along and projects from the perimeter of the window frame 104 (e.g., the full length of the vertical window frame members, a horizontal sill member, and a horizontal head member). As a result, in the illustrated example, the peripheral bead 158 is rectangular. The rectangular peripheral bead 158 is sized so that it can be inserted in the rectangular recess 154 of the cladding frame 108.

With reference to FIGS. 1-3, the peripheral bead 158 of window frame 104 has a bead outer sidewall 172 extending about and projecting from the perimeter of the window frame, a bead inner sidewall 174 inboard of the bead outer sidewall 172, and a bead front wall 176 extending between respective distal ends of the bead outer and inner sidewalls. In the illustrated example, the peripheral channel 150 has a channel outer sidewall 182, a channel inner sidewall 184 inboard of the channel outer sidewall, and a channel front wall 186 extending between respective distal ends of the channel outer and inner sidewalls. The recess 154 in which the peripheral bead 158 is received is defined by the channel outer sidewall, the channel inner sidewall 184 and the channel front wall 186.

Figure 4:
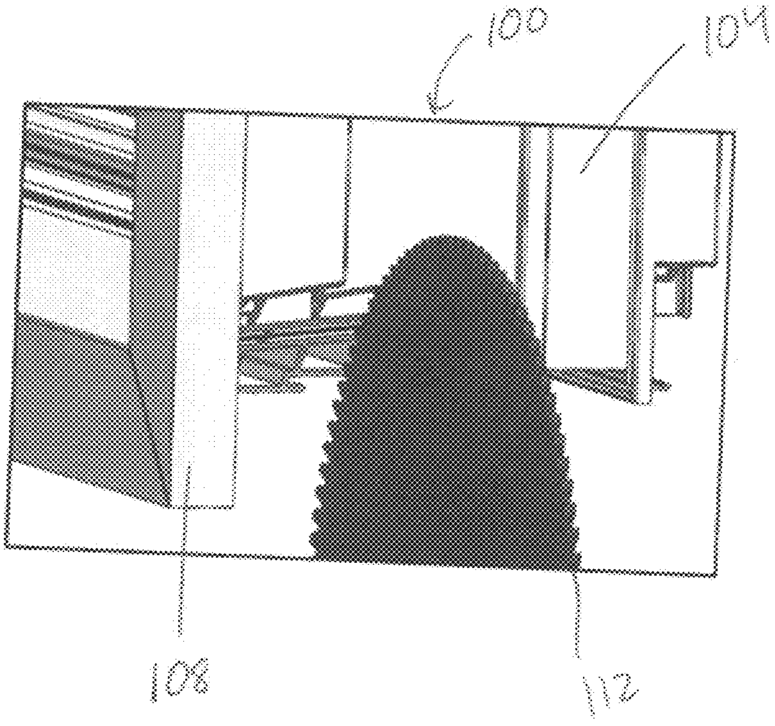
FIGS. 4 and 5 are partial perspective views of a hybrid window frame assembly showing a machine blade forming an injection block cutout on an outer corner.
Figure 5:
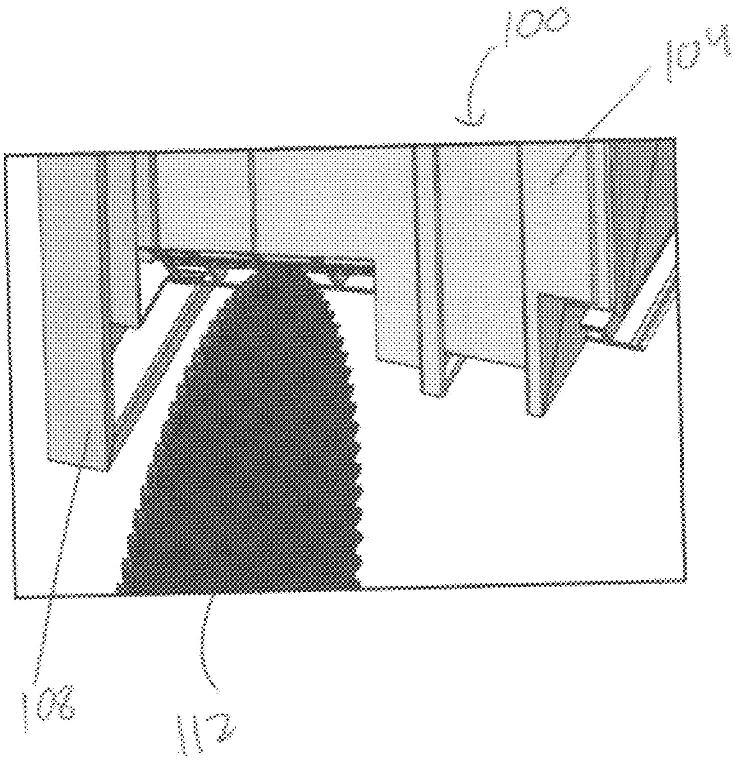
Figure 6A:
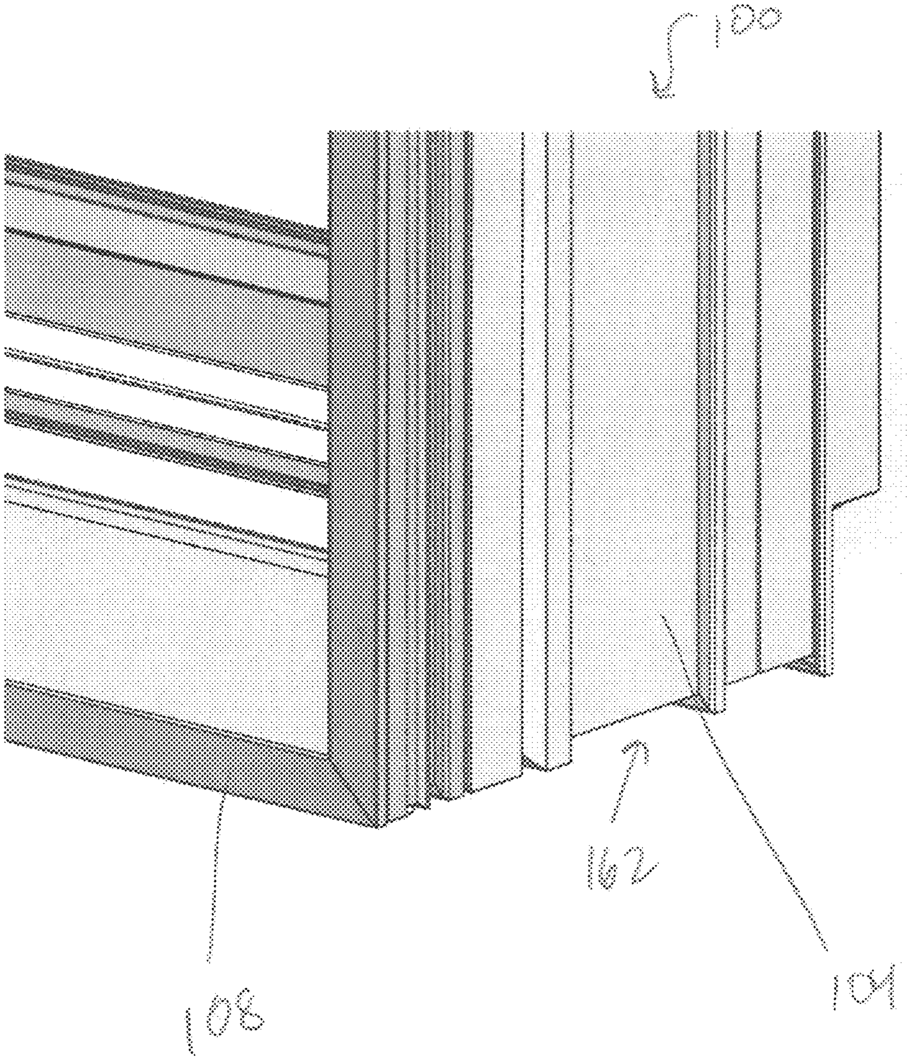
FIGS. 6A-C are partial perspective side views of a hybrid window frame assembly showing an intact hybrid window frame assembly and a hybrid window frame assembly comprising an injection block cutout formed at an outer corner thereof.
Figure 6B:
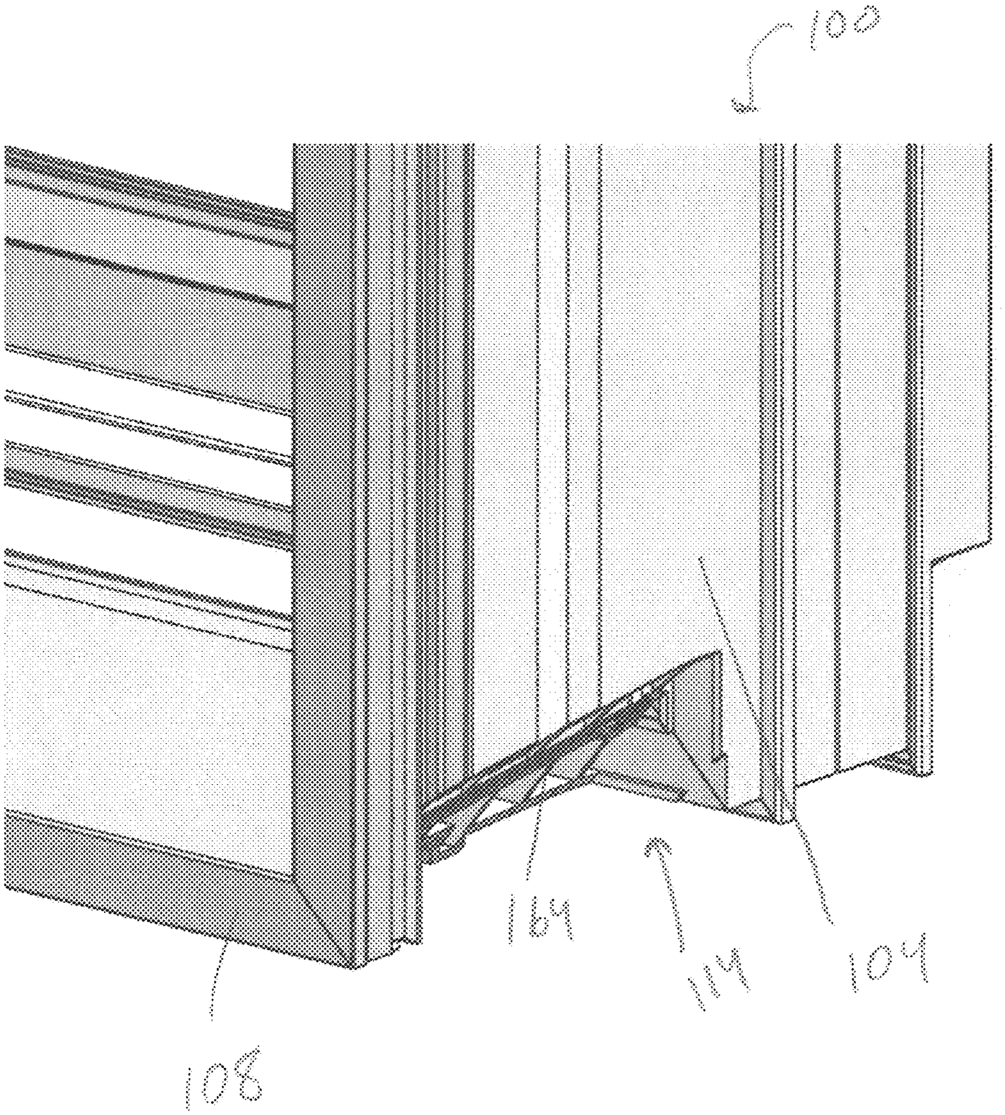

As disclosed in more detail subsequently herein, the window frame assembly 100 provides improved corner seals between the primary window frame 104 and the cladding frame 108. To provide a hidden seal at the corners, as shown in FIGS. 4 and 5, the unwelded or welded window frame assembly 100 (primary window frame 104 assembled with cladding frame 108) includes an opening formed by cutting in the back of the window frame assembly, as illustrated in FIGS. 4 and 5, thus exposing a junction of the cladding frame 108 and the window frame 104 at each corner. FIG. 6A shows an uncut window frame assembly 100, and FIG. 6B shows a cut window frame assembly 100 comprising an injection block cutout 114 at an outer corner 162 of the window frame assembly 100. Outer window frame corner 162 comprises a window frame outer corner comprising abutting vertical and horizontal window frame members 134, 132 or 138 and a cladding frame outer corner 164 comprising abutting vertical and horizontal cladding frame members 144, 142 or 146. The other outer corners of the window frame assembly 100 are similarly configured and will have similar openings following the cutting. FIGS. 4 and 5 show an example of a machine blade 112 being used to cut a welded window frame assembly from the back from different perspective views. Machine blade 112 is used to cut through window frame outer corner 162 to expose the cladding frame outer corner 164.

Figure 6C:
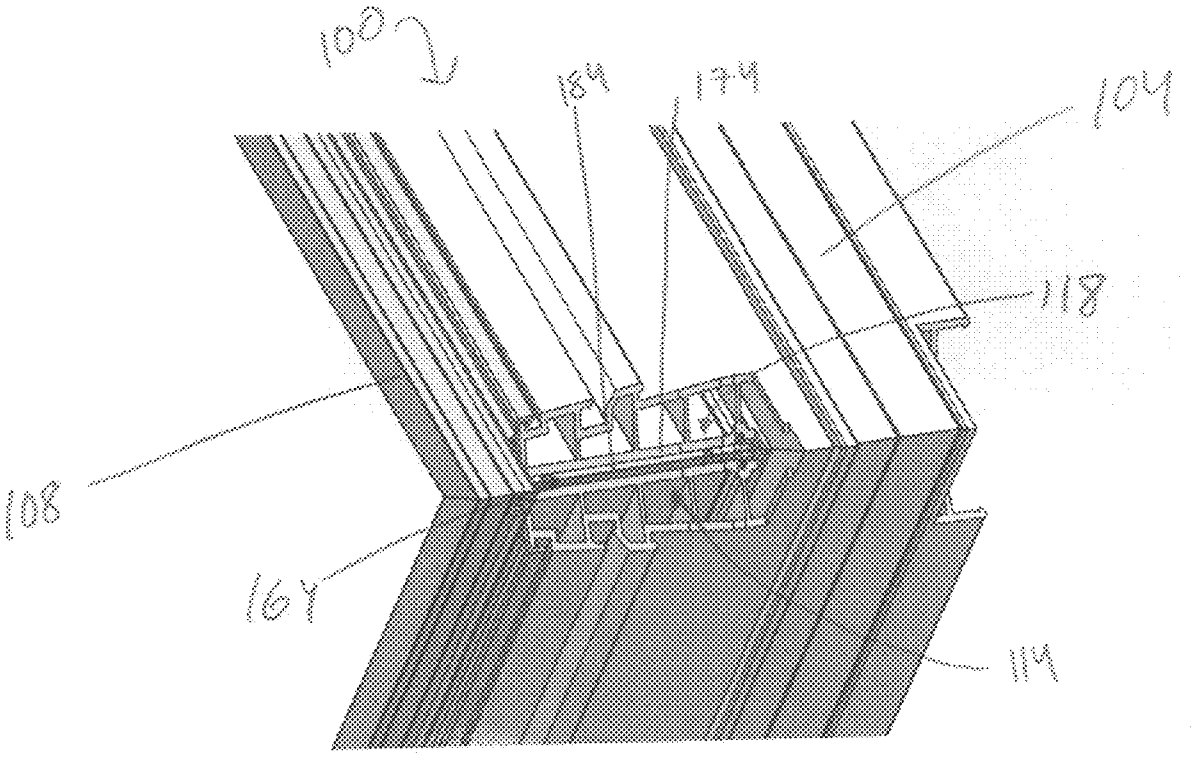

With reference to FIGS. 6B and 6C, the result of the cutting (e.g., machining) at the outer corner 162 is an injection block cutout 114. The injection block cutout 114 opens a portion of the primary window frame 104, exposing cladding frame outer corner 164 and giving access to a portion of an interior junction 118 of the cladding frame 108 and the window frame 104. As shown in FIG. 6C, interior junction 118 comprises a cut bead inner sidewall 174 portion of the window frame and a width of an intact channel inner sidewall 184 corner of the cladding frame. The cutting to form injection block cutout 114 exposes junction 118 along channel inner sidewall 184 of cladding frame 108 without compromising the integrity of the exposed channel inner sidewall 184 corner of cladding frame channel 150. Preferably, the injection block cutout 114 is sized to accommodate the injection block 122 (e.g., the injection block cutout 114 is large enough to allow the injection block 122 to fit inside). In preferred embodiments, injection block cutout 114 is sized to receive injection block 122 in a tight fit configuration to ensure injection block 122 cannot easily detach from window frame assembly 100 once inserted into injection block cutout 114.

Figure 7A:
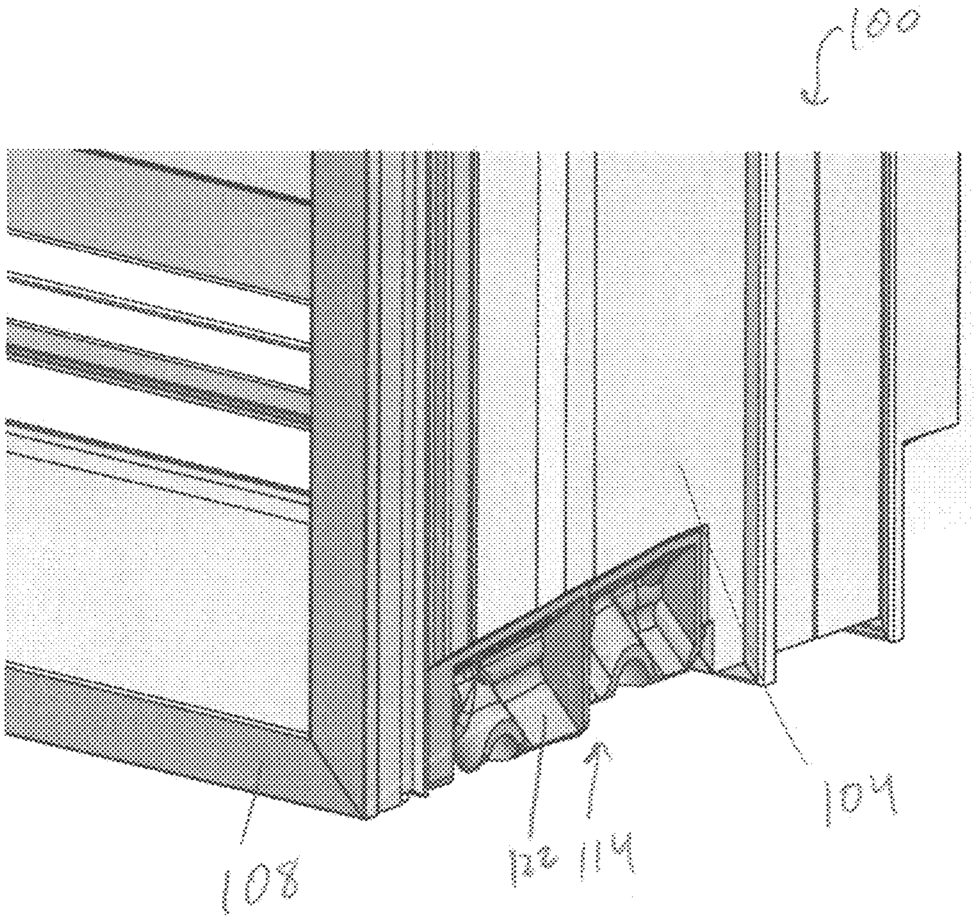
FIGS. 7A-C are partial perspective views of a hybrid window frame assembly of FIG. 6 with an injection block inserted in the injection block cutout.
Figure 7B:
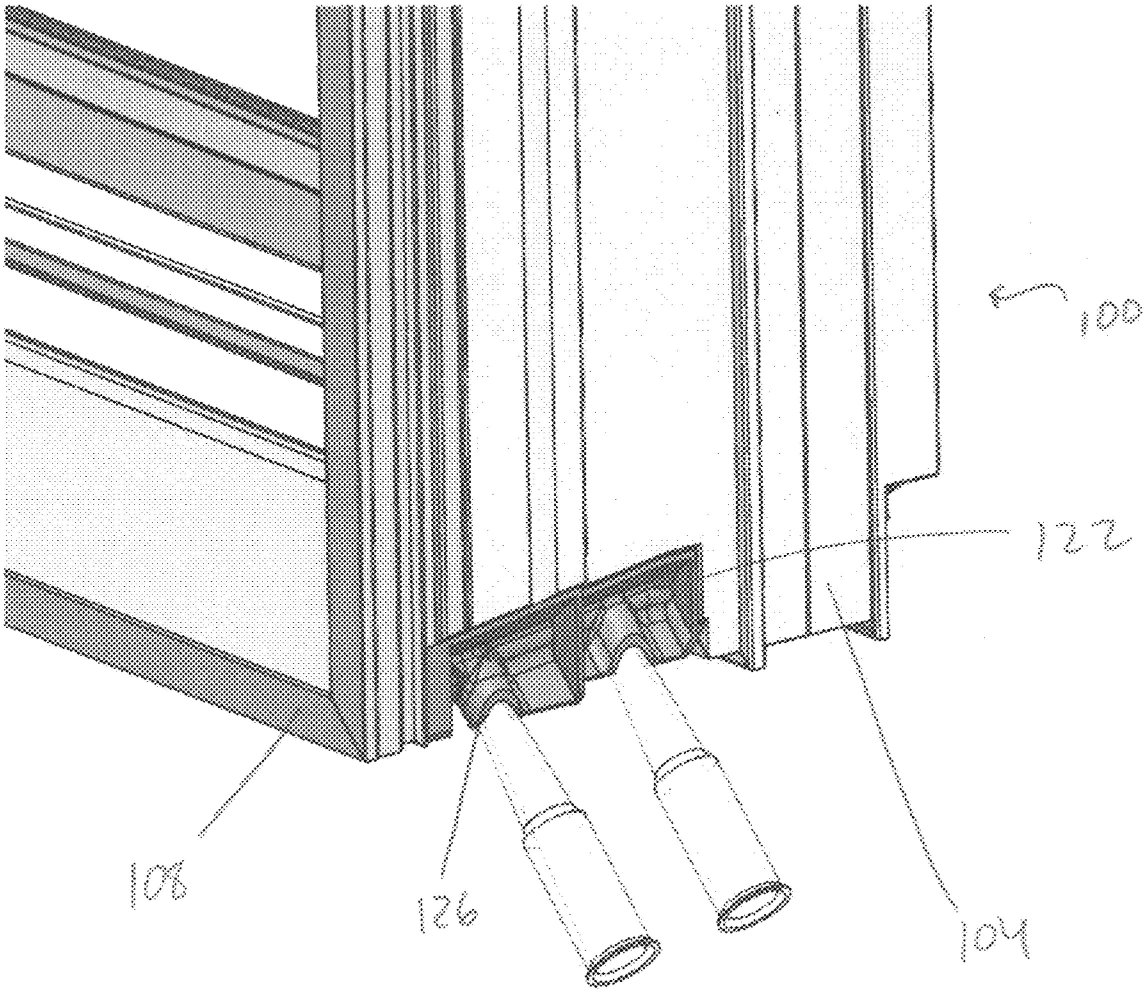
Figure 7C:
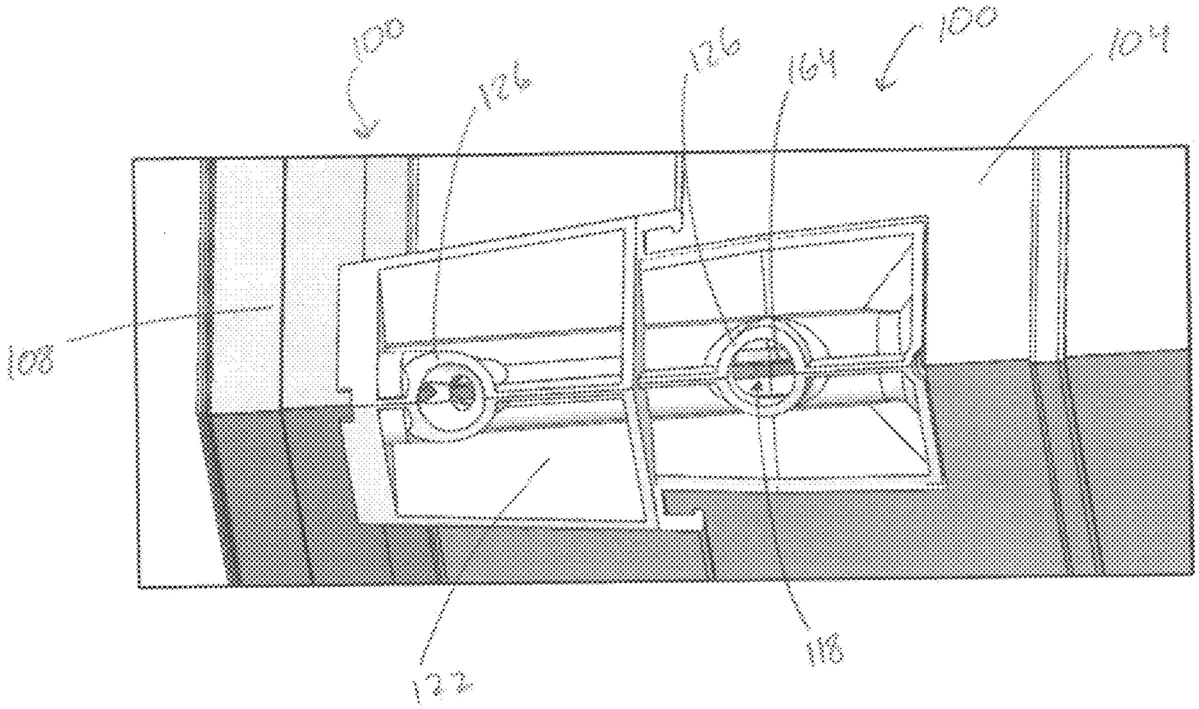

FIGS. 7A-7C show an injection block 122 inserted in the injection block cutout 114. When installed on window frame assembly 100, injection block 122 serves as a guide for sealant application. As shown in FIGS. 7B and 7C, when inserted, injection block 122 allows for injection of sealant along interior junction 118 of window frame 104 and cladding frame 108 such to form a seal between the cut window frame bead inner sidewall 174 portion and the whole width of the cladding frame channel inner sidewall 184 corner (see FIG. 6C) once the sealant is hardened. In preferred embodiments, injection block cutout 114 is sized to receive injection block 122 in a tight fit configuration to ensure injection block 122 cannot easily detach from window frame assembly 100 during sealant injection.

Figure 8A:
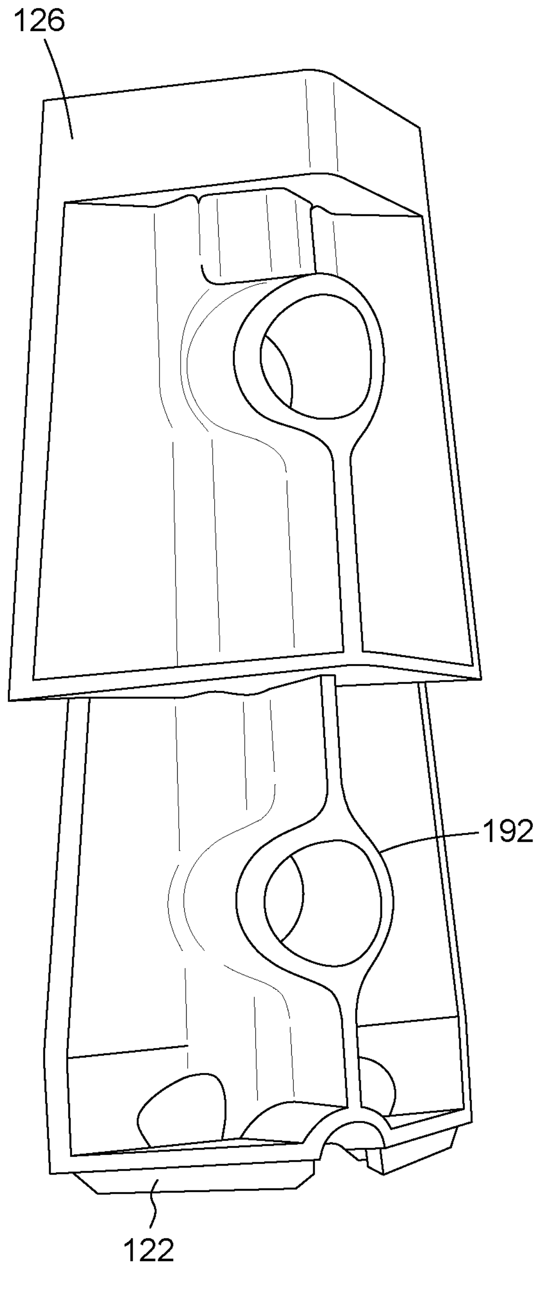
FIGS. 8A-B are a front perspective (8A) and rear perspective (8B) views of an injection block.
Figure 8B:
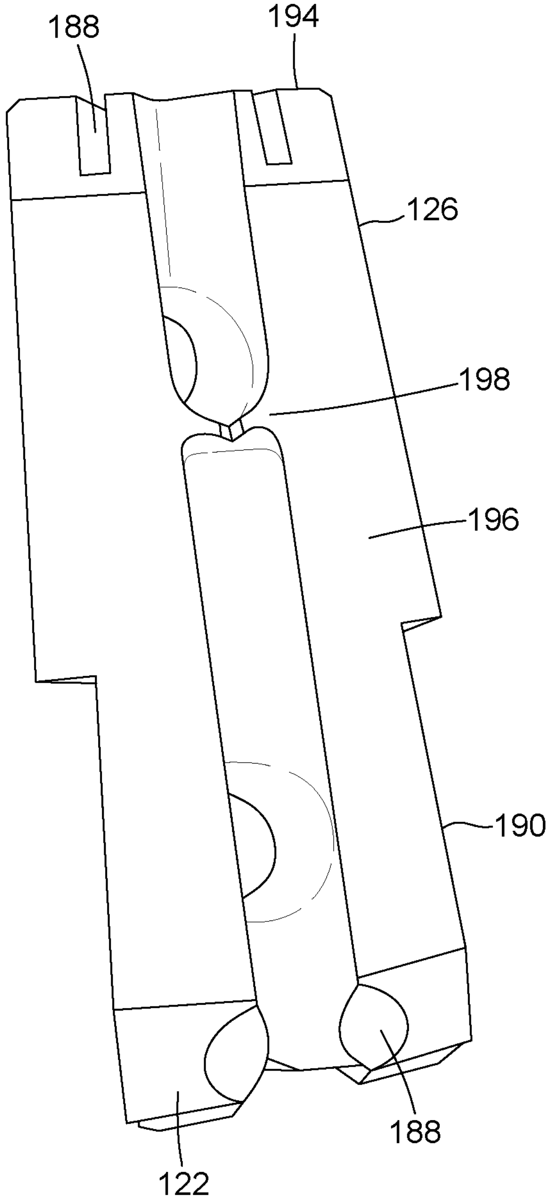

FIGS. 8A and 8B show front and rear perspectives of an injection block 122.

Figure 9:
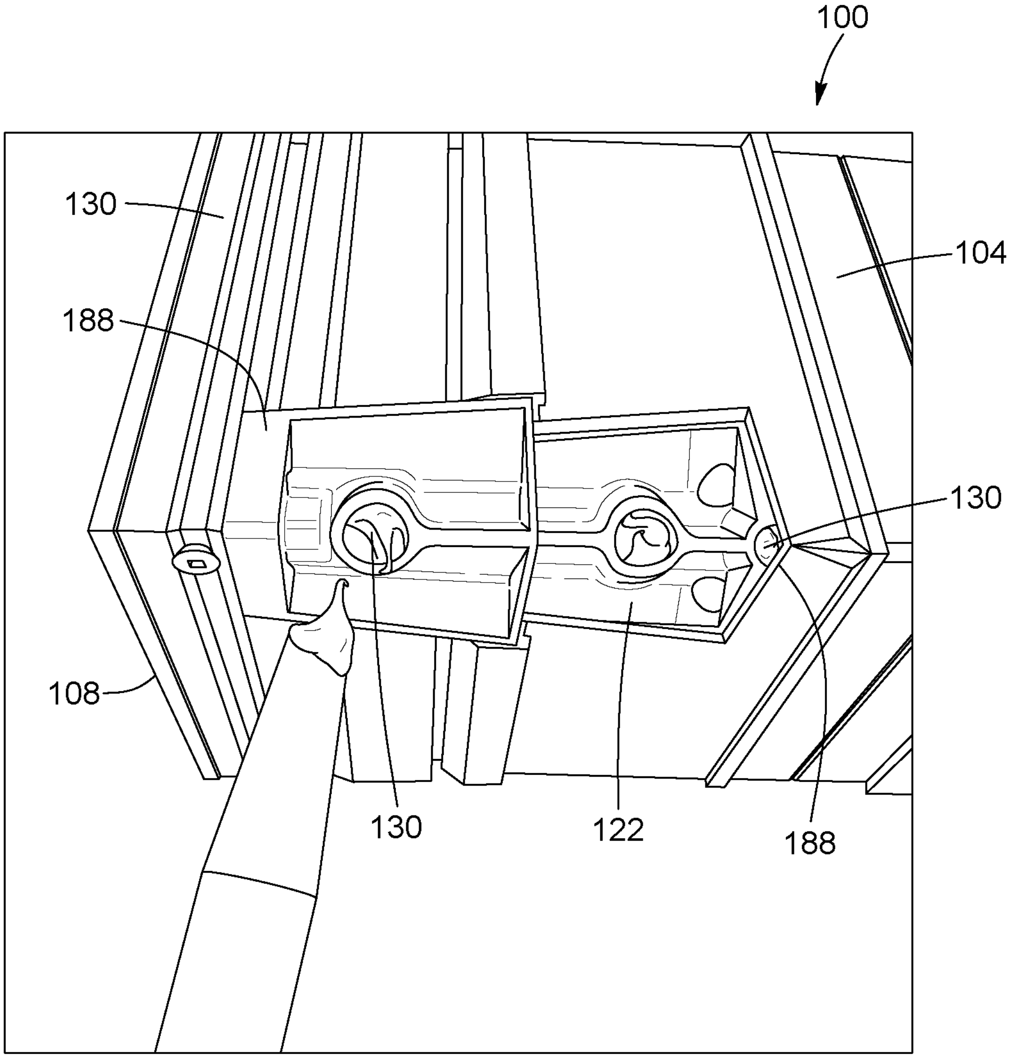
FIG. 9 is a side perspective view of a portion of a hybrid window frame assembly showing sealant directly injected through injection holes of an injection block to seal.

As shown in FIG. 9, to prevent seepage of water through cladding frame outer corner 164, sealant 130 is applied through injection hole 126 of injection block 122 such to make sealing contact among the cut portion of bead inner sidewall 174 of the window frame and the entire width of the channel inner sidewall 184 of the cladding frame forming junction 118.

Figure 10:
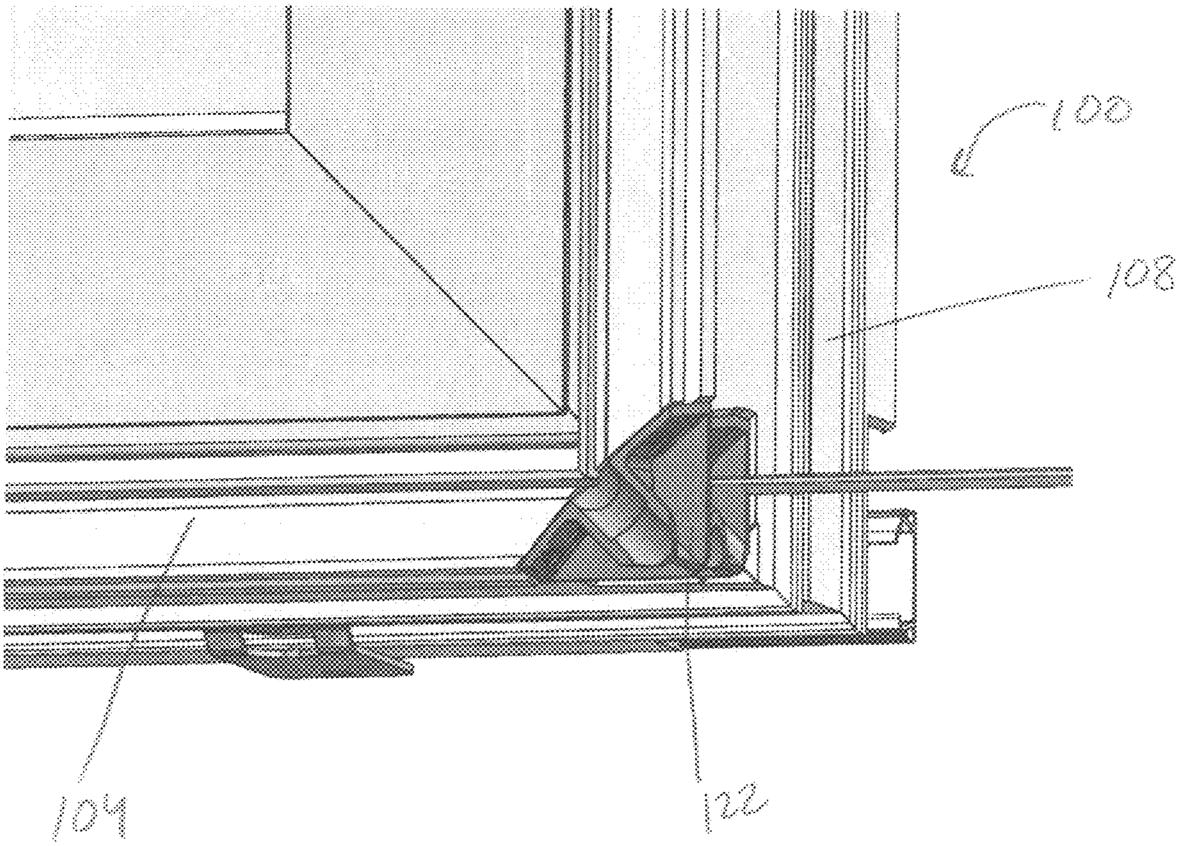
FIG. 10 is a rear perspective view of the portion of a hybrid window frame assembly showing an injection block positioned within an exemplary injection block cutout on an outer corner of the hybrid window assembly.

In preferred embodiments, injection block cutout 114 is formed such to avoid compromising the aesthetic of the hybrid window frame assembly when viewed from the front. For example, FIG. 10 shows a rear view of hybrid window assembly 100. In the embodiment shown, injection block cutout 114 is formed in window frame 104 to receive injection block 122 in a position behind a protruding portion of cladding frame 108 such to be partly or fully hidden from view behind cladding frame 108 when the window frame assembly 100 is viewed from the front. In other preferred embodiments, injection block 122 is made of a similar material and/or colour as cladding frame 108 such to visually blend with and be difficult to discriminate from cladding frame 108.

Referring to FIGS. 7A-C and 8A-B, injection block 122 is sized to fit into respectively sized injection block cutout 114 and extends through outer corner 162 of window frame assembly 100. Injection block 122 includes an inner face 190 configured to make contact with the window frame assembly when the injection block is inserted in the injection block cutout and an outer face 192 comprising at least one injection hole 126 configured to receive direct (i.e., without passing through an intervening element or material) injection of a sealant 130 (FIG. 9) from an exterior corner of the window frame assembly 100 when injection block 122 is inserted into injection block cutout 114. Injection block 122 comprises at least one sealant channel 194 defined along the inner side, wherein the sealant channel 194 is confluent with injection holes 126 and is configured to distribute the sealant 130 injected directly into injection hole 126 along the length of interior junction 118 of window frame 104 and cladding frame 108 comprised in window frame assembly 100. When the sealant 130 is injected into injection hole 126, the sealant channel 194 distributes the sealant 130 along junction 118 to seal together a cut portion of bead inner sidewall 174 of window frame 104 and a width of an exposed channel inner sidewall 184 corner of cladding frame 108 (FIG. 7C). As shown in FIG. 9, injection hole 126 can provide visual feedback for when sufficient sealant has been applied through injection block 122. Once gaps formed between window frame assembly 100 and injection block 122 installed in an injection block cutout 114 have been sufficiently filled with sealant 130, injected sealant 130 can be seen to seep back out of injection hole 126.

In the illustrated examples of FIGS. 7A-C and 8A-B, each injection block 122 includes spaced apart first and second injection holes 126, however injection block 122 can comprise a single injection hole 126, or more than two, as is apparent to a person skilled in the art.

In embodiments, the inner face 190 of injection block 114 can comprise one or more interconnected sealant channels that are confluent with injection holes 126 to direct and distribute sealant along a desired path to seal junction 118. Having multiple spaced apart injection holes 126 and/or multiple interconnected channels may facilitate a more even distribution of sealant along the interior junction 118 compared to having only a single injection hole 126 or a single sealant channel 194.

As shown in FIG. 8A-B, in embodiments, a sealant channel 194 may be divided into one or more interconnected cavities 196 which are each confluent with an injection hole 126 to provide sealing along junction 118. In these embodiments, a cavity 196 is formed in an injection block inner face 190 to provide a chamber into which sealant 130 can be injected through a confluent injection hole 126. Adjacent cavities 196 are interconnected via a small cavity opening 198 to permit controlled passage of sealant between the adjacent cavities. In these embodiments, injection of sealant 130 through the injection hole 126 into an interconnected cavity 196 fills the cavity 196 with sealant 130. Once a cavity 196 is filled with sealant 130, sealant 130 can seep into an adjoining cavity through the cavity opening 198 to fill any further sealant-free gaps formed between injection block 122 and window assembly 100 in the adjoining cavity 196 to provide a continuous gap-free seal along junction 118.

In preferred embodiments, as shown in FIGS. 8A-B, one or more vents 188 confluent with a sealant channel 126 and/or a cavity 196 are disposed in one or both distal ends of injection block 114 to provide additional visual feedback for determining whether sufficient sealant has been applied through injection holes 126 such to seal along the entire length of junction 118 of window frame assembly 100. In these embodiments, visual confirmation that a sufficient amount of sealant 130 has been applied along junction 118 through injection hole 126 is obtained when sealant can be seen to seep out of injection block 114 through vents 188 during injection of sealant 130.

FIG. 9 shows a portion of the window frame assembly 100 after sealant 130 has been injected thorough the injection holes 126 of the injection block 122 when inserted in the injection block cutout 114. Any type of sealant 130 suitable for creating a watertight seal at junction 118 of window assembly 100 may be used. In preferred examples, the sealant is made of a flexible material. In some examples, the sealant 130 may be in a liquid or foam form and may comprise silicone. In other examples, sealant 130 may comprise elastomeric polymers, synthetic resins, polyurethane, acrylic, and/or latex and/or others known in the art. FIG. 8 shows that the injected sealant 130 disperses and covers a wide area to provide a watertight seal between the corners of the metal cladding frame 108 and the window frame 104.

Methods of Manufacturing Hybrid Window Frame Assemblies

One advantage of the hybrid window frame assembly 100 is that the cladding frame 108 can be assembled on the window frame 104 before or after cutting and welding.

A hybrid window frame as herein disclosed is assembled by positioning a cladding frame on a window frame to produce a hybrid window frame. Each outer corner of the hybrid window frame is then opened (e.g., by cutting or machining) such to expose an inner sidewall corner of the cladding frame as herein described. An injection block is inserted into each of the openings, each injection block having at least one injection hole. Sealant is then directly injected through the at least one injection hole of each injection block to create watertight seals between the cladding frame and the primary window frame at each corner of the hybrid window frame. Once the window and cladding frames are sealed together to form a hybrid window frame assembly, the hybrid window frame assembly can then be cut and welded.

Alternatively, a hybrid window frame can be assembled by cutting and then welding a cladding frame and cutting and then welding a window frame prior to positioning the cladding frame on the window frame to produce a hybrid window frame.

The opening at each outer corner of a hybrid window frame can be provided using a cutting machine to cut the openings as herein described, for example using a cutting machine having a rotating blade such as a conventional window corner cleaner known in the art (e.g., Stürtz® machinery 4AS corner cleaner).

The hybrid window frame assembly 100 does not necessarily require that a cladding frame 108 be installed on the window frame 104 before cutting and welding. The hybrid window frame assembly 100 can be assembled in a conventional way (cut and weld separate window and cladding frames, assemble the cladding and window frames in a second step), and then using injection blocks 122 to inject sealant 130 as discussed above.

It is to be understood that "a", "an" and "the" include plural referents unless the content clearly dictates otherwise.

What has been described above is intended to be illustrative of examples of the teaching disclosed herein, without limiting the scope of patent claims granted herefrom. The scope of such claims should be given the broadest interpretation consistent with the description as a whole.

The invention claimed is:

1. A hybrid window frame assembly comprising:

a) a window frame formed of a first material and including a pair of horizontally spaced apart vertical window frame members connected by an upper horizontal window frame member and a lower horizontal window frame member arranged to define a central window opening, the window frame including a peripheral bead having a bead outer sidewall extending about a perimeter of the window frame, a bead inner sidewall inboard of the bead outer sidewall, and a bead front wall extending between respective distal ends of the bead outer and inner sidewalls, the window frame having four window frame corners, each window frame corner formed at a junction between an end of one of the vertical window frame members and a corresponding end of one of the horizontal window frame members;

b) a cladding frame formed of a second material different from the first material and including a pair of horizontally spaced apart vertical cladding frame members connected by an upper horizontal cladding frame member and a lower horizontal cladding frame member, the cladding frame including a peripheral channel having a channel outer sidewall, a channel inner sidewall inboard of the channel outer sidewall, and a channel front wall extending between respective distal ends of the channel outer and inner sidewalls, the channel outer sidewall, the channel inner sidewall and the channel front wall defining a recess in which the peripheral bead is received to connect the cladding frame to the window frame, the cladding frame having four cladding frame corners, each cladding frame corner aligned with a corresponding one of the window frame corners and formed at a junction between an end of one of the vertical cladding frame members and a corresponding end of one of the horizontal cladding frame members;

c) four injection block cutouts, each injection block cutout extending through at least a portion of the channel outer sidewall, the bead outer sidewall and the bead inner sidewall to provide a cut bead inner sidewall portion and to expose a portion of the channel inner sidewall at a respective one of the cladding frame corners;

d) four injection blocks, each injection block sized to fit in a respective one of the injection block cutouts, each injection block including at least one injection hole accessible from an exterior of the window frame assembly; and e) sealant injected through the at least one injection hole of each injection block to seal the window frame to the cladding frame along an interior junction of the window frame and the cladding frame, the interior junction comprising a width of the channel inner sidewall of the cladding frame, wherein the sealant seals the width of the channel inner sidewall to the cut bead inner sidewall portion.

2. The hybrid window frame assembly of claim 1, wherein the first material is polyvinyl chloride.

3. The hybrid window frame assembly of claim 1, wherein the second material is metal.

4. The hybrid window frame assembly of claim 1, wherein the second material is aluminum.

5. The hybrid window frame assembly of claim 1, wherein the sealant comprises silicone.

6. The hybrid window frame assembly of claim 1, wherein the at least one injection hole of each injection block includes spaced apart first and second injection holes.

7. The hybrid window frame assembly of claim 1, wherein the central window opening is configured to engage one or more window panes.

8. The hybrid window frame assembly of claim 7, wherein each of the vertical and horizontal window frame members defining the window opening have an inner surface configured to engage a respective side of a window sash.

9. A hybrid window frame assembly comprising:

a) a window frame formed of a first material and including at least three window frame members arranged to define a central window opening, the window frame having a peripheral bead extending about and projecting from a perimeter of the window frame, the window frame having at least three window frame corners, each window frame corner formed at a junction between two abutting window frame members of the at least three window frame members;

b) a cladding frame formed of a second material and including at least three cladding frame members, each cladding frame member associated with a respective one of the window frame members, the cladding frame having a peripheral channel extending about a perimeter of the cladding frame, the channel defining a recess in which the peripheral bead is received to connect the cladding frame to the window frame, the cladding frame having at least three cladding frame corners, each cladding frame corner aligned with a respective one of the window frame corners and formed at a junction between two abutting cladding frame members of the at least three cladding frame members;

c) at least three injection block cutouts, each injection block cutout extending through at least a portion of the peripheral bead and the peripheral channel to provide a cut bead inner sidewall portion and to expose a portion of the inner sidewall of the channel at a respective one of the cladding frame corners;

d) at least three injection blocks, each injection block sized to fit in a respective one of the injection block cutouts, each injection block including at least one injection hole accessible from an exterior of the window frame assembly; and e) sealant injected through the at least one injection hole of each injection block to seal the bead inner sidewall of the window frame to the cladding frame along an interior junction of the window frame and the cladding frame, the interior junction comprising a width of the channel inner sidewall of the cladding frame, wherein the sealant seals the width of the channel inner sidewall to the cut bead inner sidewall portion.

10. The hybrid window frame assembly of claim 9, wherein the first material is polyvinyl chloride (PVC).

11. The hybrid window frame assembly of claim 9, wherein the second material is metal.

12. The hybrid window frame assembly of claim 11, wherein the second material is aluminum.

13. The hybrid window frame assembly of claim 9, wherein the peripheral bead has a bead outer sidewall extending about and projecting from the perimeter of the window frame, a bead inner sidewall inboard of the bead outer sidewall, and a bead front wall extending between respective distal ends of the bead outer and inner sidewalls.

14. The hybrid window frame assembly of claim 13, wherein the peripheral channel has a channel outer sidewall, a channel inner sidewall inboard of the channel outer sidewall, and a channel front wall extending between respective distal ends of the channel outer and inner sidewalls, and the recess in which the peripheral bead is received is defined by the channel outer sidewall, the channel inner sidewall and the channel front wall.

15. The hybrid window frame assembly of claim 9, wherein the sealant comprises silicone.

16. The hybrid window frame assembly of claim 9, wherein the at least one injection hole of each injection block includes spaced apart first and second injection holes.

17. The hybrid window frame assembly of claim 9, wherein the central window opening is configured to engage one or more window panes.

18. The hybrid window frame assembly of claim 17, wherein each of the vertical and horizontal window frame members defining the window opening have an inner surface configured to engage a respective side of a window sash.

19. A method of manufacturing a hybrid window frame assembly, the method comprising:

positioning a cladding frame made from a first material on a window frame made from a second material to produce a hybrid window frame;

providing an opening at each outer corner of the hybrid window frame that exposes an inner sidewall of the cladding frame;

inserting an injection block into each of the openings, each injection block having at least one injection hole; and injecting sealant through the at least one injection hole of each injection block to create watertight seals between the cladding frame and the window frame at an interior junction of the window and cladding frames at each corner of the hybrid window frame.

20. The method of claim 19, further comprising:

after said injecting, cutting and then welding the hybrid window frame assembly.

21. The method of claim 19, further comprising:

before said positioning, cutting and then welding the cladding frame; and before said positioning, cutting and then welding the window frame.

22. The method of claim 19, wherein said providing the opening at each corner of the hybrid window frame comprises using a cutting machine to cut the opening.

23. A hybrid window frame injection block sized to fit in a respective injection block cutout extending through at least a portion of a channel outer sidewall of a cladding frame, a bead outer sidewall of a window frame, and a bead inner sidewall of the window frame at an outer corner portion of the window frame assembly, the cutout exposing a width of a channel inner sidewall of the cladding frame and providing a cut bead inner sidewall portion, comprising:

an inner face configured to sealingly engage the exposed width of the channel inner sidewall of the cladding frame and the cut bead inner sidewall portion along an interior junction when the injection block is inserted in the injection block cutout;

an outer face comprising at least one injection hole configured to receive injection of a sealant from an exterior corner of the window frame assembly when the injection block is inserted in the injection block cutout, the injection block being configured for a tight interference fit in the injection block cutout such that the outer face is concealed behind a protruding portion of a cladding front wall when viewed from the front of the window frame assembly; and at least one sealant channel defined along the inner face, wherein the sealant channel is confluent with the at least one injection hole and is configured to distribute the sealant injected into the injection hole along an interior junction of a window frame and a cladding frame comprised in the window frame assembly, and one or more vents disposed at a distal end and confluent with the at least one sealant channel, the one or more vents being configured to provide visual feedback when the interior junction is filled with the sealant.

24. The hybrid window frame injection block of claim 23, wherein the at least one injection hole comprises two or more spaced apart injection holes.

25. The hybrid window frame injection block of claim 24, wherein the at least one sealant channel comprises two or more confluent sealant channels.

26. The hybrid window frame injection block of claim 23, wherein the at least one sealant channel comprises two or more interconnected cavities.

* * * * *